United States Patent [19]

Strutt

[11] 4,273,005
[45] Jun. 16, 1981

[54] STEERING COLUMN ASSEMBLY

[75] Inventor: Derek W. Strutt, Great Baddow, England

[73] Assignee: Ford Motor Company, Dearborn, Mich.

[21] Appl. No.: 14,464

[22] Filed: Apr. 20, 1979

[51] Int. Cl.³ .............................................. B62D 1/18
[52] U.S. Cl. ........................................ 74/492; 74/493; 74/531; 188/1 C
[58] Field of Search ......................... 74/492, 493, 531; 188/1 C

[56] References Cited
U.S. PATENT DOCUMENTS

| 3,475,984 | 11/1969 | Ward | 74/492 |
| 3,597,994 | 8/1971 | Shiomi et al. | 74/492 |

FOREIGN PATENT DOCUMENTS

| 902586 | 1/1954 | Fed. Rep. of Germany | 74/493 |
| 1780061 | 7/1968 | Fed. Rep. of Germany | 74/492 |

Primary Examiner—Allan D. Herrmann
Attorney, Agent, or Firm—Steven L. Permut; Clifford L. Sadler

[57] ABSTRACT

A steering column assembly having upper and lower telescoping shaft sections, a jacket surrounding the upper shaft section and an extensible deforming member surrounding the jacket and connected at one end thereto. A U-shaped clamp clamps onto the deforming member and is pivotably mounted to a mounting bracket. The deformable member slides through the clamp upon manual adjustment of the steeing shafts to form a steering column of a desired length but, upon impact, the clamp pivots with respect to the mounting bracket and increases its clamping force upon the deformable member to prevent sliding of the jacket.

11 Claims, 2 Drawing Figures

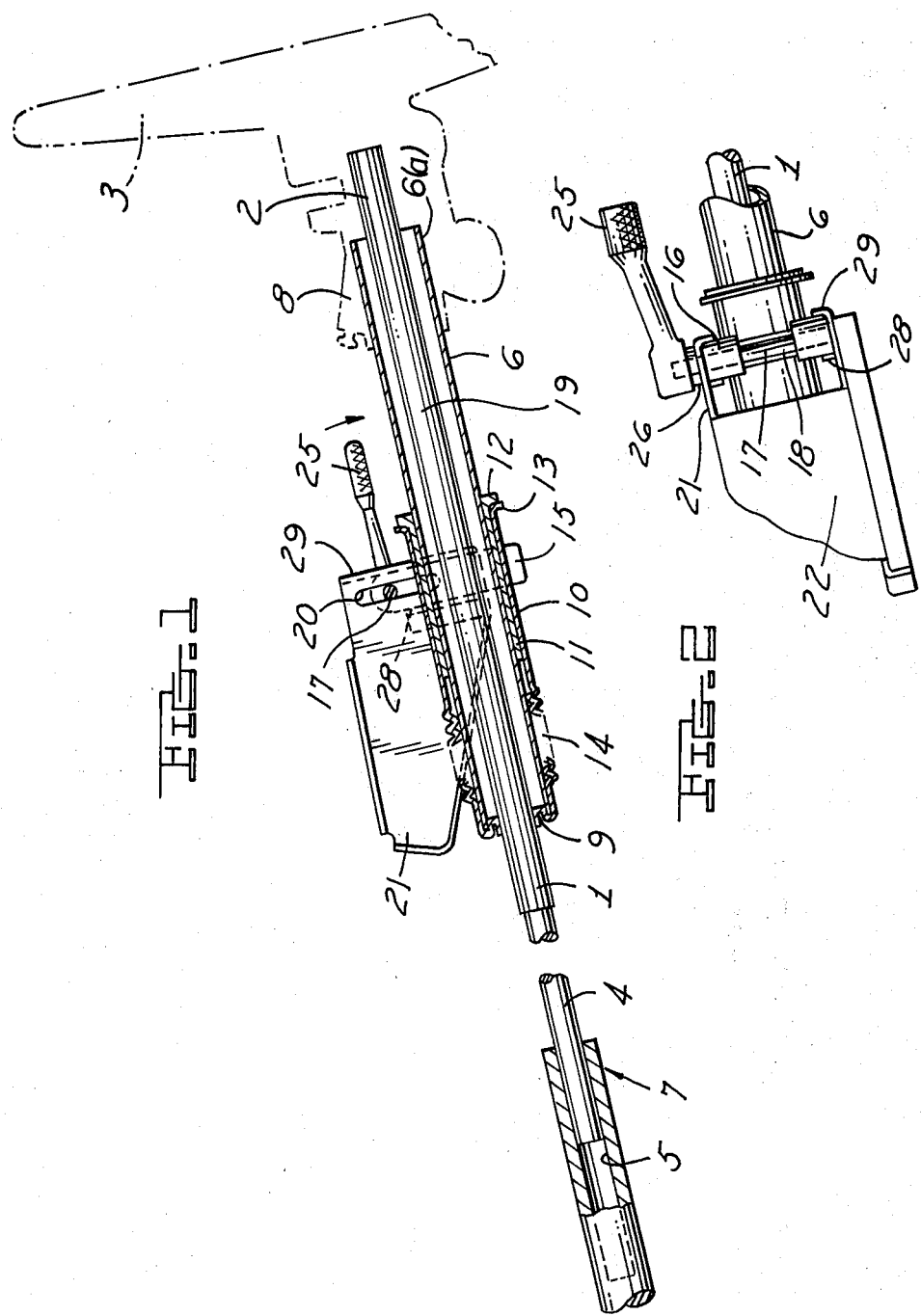

STEERING COLUMN ASSEMBLY

BACKGROUND OF THE INVENTION

1. Field of the Invention

This invention relates to a collapsible and adjustable steering column assembly.

2. Description of the Prior Art

One conventional form of a steering column assembly comprises two shaft sections one of which is axially adjustable relative to the other to allow the length of the steering column to be varied by the driver. These two sections are supported in a non-rotatable jacket which is attached to the vehicle body and which is movable with the adjustable shaft section. It has also been proposed to connect the jacket to the vehicle body by an element which deforms under impact loads to allow the steering column to collapse at a controlled rate so that the kinetic energy of impact is absorbed in a gradual movement of the column. Where such elements are incorporated in adjustable steering columns the connection between the deformable element and the vehicle body are slidable to accommodate the adjustment of the steering column.

In addition, deformable elements have been constructed to plastically stretch as well as compress. Two such extending deformable elements are disclosed in U.S. Pat. No. 3,475,984 issued to Ward on Apr. 10, 1969 and U.S. Pat. No. 3,597,994 issued to Shiomi on Aug. 10, 1971.

SUMMARY OF THE DISCLOSURE

According to the present invention there is provided a steering column assembly comprising an upper rotatable shaft section adapted at one end to carry a steering wheel, a lower rotatable shaft section, adapted at one end for connection to a steering linkage and connected to the upper shaft section for rotation therewith about a common steering axis, the upper shaft section being axially movable relative to the lower shaft section, whereby the length of the shaft may be adjusted, a jacket surrounding and rotatably supporting the upper shaft section, a deformable member coaxially mounted with the jacket and connected thereto at one end, the deformable member being capable of altering its length under impact loads, a clamp extending around the deformable member towards the other end thereof, and a mounting bracket carrying the clamp and being deformable to allow the clamp to move under impact loads and to increase the clamping force on the deformable member.

Preferably the clamp is connected to the bracket for rotation under impact loads about a transverse axis spaced from the steering axis. The clamp will therefore rotate out of the plane which it normally occupies and exert a layer lateral clamping force on the deformable member. In order to allow this movement of the clamp, the bracket conveniently includes one or more abutments which engage with the clamp but which deflect under impact loads to allow the clamp to rotate.

Desirably the clamp is releasably mounted in the bracket for movement in a direction normal to the steering axis so that, in use, the driver can adjust the height of the steering wheel as well as the length of the column.

The deformable member may be constructed to extend or to contract under impact loads. In either case, the deformable section of the member is preferably in the form of a plurality of circumferential corrugations. In the preferred embodiment of the invention, the deformable member includes a section which extends under impact loads to increase the length of the member. The deformable member surrounds the jacket and will usually be connected to the jacket towards the end of the jacket nearer the lower column section.

BRIEF DESCRIPTION OF THE DRAWINGS

A preferred steering column assembly in accordance with the invention will now be described, by way of example only, with reference to the drawings in which:

FIG. 1 is a side view of part of the assembly and

FIG. 2 is a fragmentary plan view of the assembly of FIG. 2

DETAILED DESCRIPTION OF THE DRAWINGS

Referring to the drawings, the steering column assembly comprises an upper steering shaft section 1 which is splined at its upper end 2 for connection to a steering wheel 3, indicated in broken lines. The lower end 4 is connected to a coaxial lower steering shaft section 5 by means of a telescopic coupling, indicated schematically at 7. This coupling allows the upper shaft section 1 to move axially with respect to the lower shaft section 5, whereby the driver can vary the length of the column assembly. The coupling 7 is of conventional construction and will be familiar to a person skilled in the art. Details of its construction have therefore been omitted for the sake of brevity.

The lower end of the lower shaft drives a conventional steering linkage (not shown).

A jacket 6 rotatably supports the upper shaft section 1 in thrust bearings (not shown). A casing 8, incorporating a steering column lock, ignition switch and other controls conventionally mounted on the steering column, is attached to the upper end 6(a) of the jacket 6. A flexible seal 9 seals the lower end of the jacket 6 to the upper shaft section 2.

A deformable member in the form of a tube 10 surrounds the jacket 6 and is connected rigidly to the lower end of the jacket 6. The central and upper regions of the tube 10 are spaced from the jacket 6 by liners 11 and 12. The tube 10 is provided with a deformable section 14 in the form of a series of circumferential corrugations. The upper end of the tube 10 terminates in an outwardly turned flange 13.

A U-shaped clamp 15 extends around the upper region of the tube 10. Each limb of the clamp 15 terminates in a boss 16 through which a pivot pin 17 pass through vertical slots 20 in opposed side walls 21 of a mounting bracket 22 which is fixed to the vehicle body. A locking lever 25 fixed to one end of the pivot pin 17 carries a cam 26 which engages with one side wall 21 of the mounting bracket 22. Rotation of the lever 25 in the direction of the arrow of FIG. 1 causes the cam 26 to bear on the side wall 21 and thereby to exert a lateral force on the boss 16 of the clamp 15. As a result, a clamping force is applied to the tube 10. Since the pivot pin 17 is movable vertically in the slots 20, the driver can vary the height of the steering wheel 3.

The clamp 15 abuts with two pairs of transverse flanges 28, 29 on the side walls 21 which guide the clamp 15 in its vertical movement. The lower flanges 28 of each pair are formed by cutting part of the plate material from which the bracket 22 is made and bending them towards the rear of the steering column, i.e. towards the end of the column section 2 on which the steering wheel 3 is mounted.

In use, the driver releases the clamp 15 by means of the handle 25 and positions the steering wheel at an appropriate distance from himself and at an appropriate height.

Under impact conditions, the load exerted on the steering wheel 3 by the driver is transmitted to the jacket 6 and then to the tube 10.

The upper column section 2 slides into the lower column section 5. If the upper section 2 of the steering column has been depressed fully towards the bracket 22, the flange 13 on the upper end of the tube 10 will abut the edge of the clamp 15 nearer to the steering wheel 3. On impact, the upper column section 2 slides into the lower section 5. The movement of the jacket 6 with the column 2 causes the tube 10 to be placed in tension, and the corrugated section 14 of the tube 2 to extend. Upon impact the forwardly directed kinetic energy of the driver is absorbed by the work required to extend this section.

If the upper section 2 of the steering column has not been depressed fully towards the bracket 22, as illustrated in FIG. 1, the force exerted on the tube 10 under impact conditions tends to rotate the clamp 15 about the axis of the pin 17. The flanges 28 offer relatively little resistance to this pivotal movement under such conditions and deflect so that the clamp 15 rotates relative to the jacket 6. The clamping force exerted on the jacket 6 by the clamp 15 is therefore increased and any tendency of the jacket 6 to slide through the clamp 15 is resisted. Consequently, on impact, the convoluted section 14 is extended by its full amount even when the flange 13 does not initially bear against the clamp 15. Therefore, the column can absorb kinetic energy and in the same fashion by deformation of tube 10 regardless of the initial setting of the steering in the bracket 22.

Variations and modifications of the recent invention are possible without departing from its scope and spirit as defined by the appended claims.

I claim:

1. A steering column assembly comprising;
   an upper rotatable shaft section adapted at one end to carry a steering wheel;
   a lower rotatable shaft section adapted at one end for connection to a steering linkage and connected to the upper shaft section for rotation therewith about a common steering axis;
   the upper shaft section being axially movable relative to the lower shaft section, whereby the length of the column may be adjusted;
   a jacket surrounding and rotatably supporting the upper shaft section;
   a deformable member coaxially mounted on the jacket and connected to the jacket at one end, thereby the deformable member being capable of altering its length under impact loads;
   a clamp extending around the deformable member towards the other end thereof; and
   a mounting bracket carrying the clamp and being deformable to allow the clamp to move under impact loads and to increase the clamping force on the deformable member.

2. A steering column assembly as defined in claim 1 wherein the deformable member surrounds the jacket and includes a section which extends under impact loads to increase the length of the deformable members, and the deformable member is connected to the jacket towards the end nearer the lower shaft section.

3. A steering column assembly as defined in claim 1 or claim 2 wherein the clamp is connected to the bracket for rotation under impact loads about a transverse axis spaced from the steering axis.

4. A steering column assembly as defined in claim 3 wherein the clamp engages an abutment between the transverse axis and the steering axis, which deflects under impact load to permit rotation of the clamp.

5. A steering column assembly as defined in claims 1 or 2 wherein the clamp is releasably mounted in the bracket for movement in a direction normal to the steering axis.

6. A steering column assembly as defined in claim 3 wherein the clamp is releasably mounted in the bracket for movement in the direction normal to the steering axis.

7. A steering column assembly as defined in claim 4 wherein the clamp is releasably mounted in the bracket for movement in a direction normal to the steering axis.

8. A steering column assembly as defined in claims 1 or 2 wherein the deformable member includes a deformable section which comprises a plurality of circumferential corrugations.

9. A steering column assembly as defined in claim 3 wherein the deformable member includes a deformable section which comprises a plurality of circumferential corrugations.

10. A steering column assembly as defined in claim 4 wherein the deformable member includes a deformable section which comprises a plurality of circumferential corrugations.

11. A steering column assembly as defined in claim 5 wherein the deformable member includes a deformable section which comprises a plurality of circumferential corrugations.

* * * * *